Dec. 8, 1959              H. SOMMER              2,916,146
PROCESS AND APPARATUS FOR SEPARATING SOLID
PARTICLES FROM HIGHLY VISCOUS FLUIDS
Filed Nov. 6, 1957              2 Sheets-Sheet 2
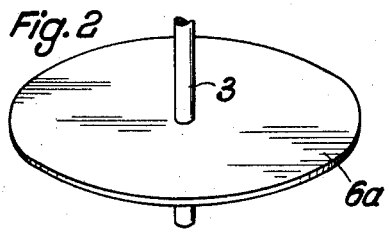
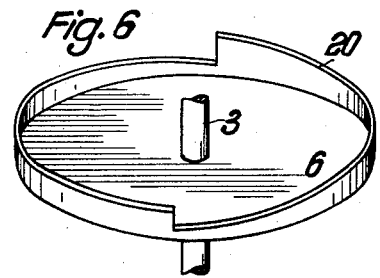
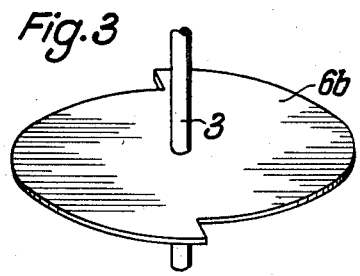
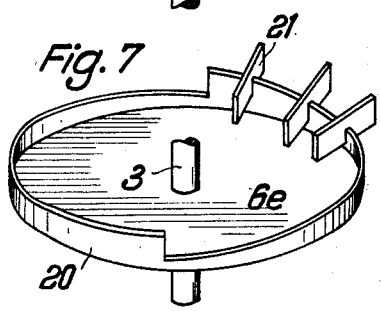
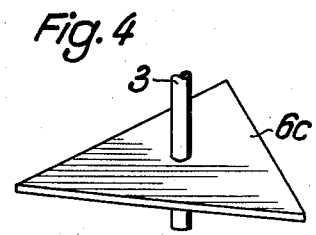
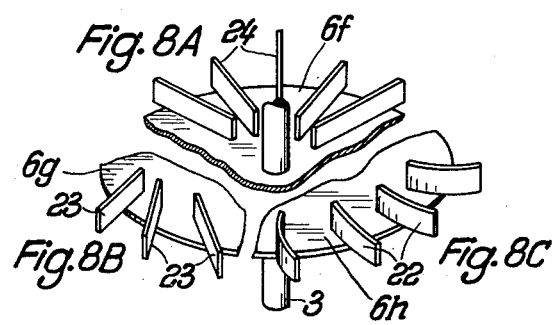
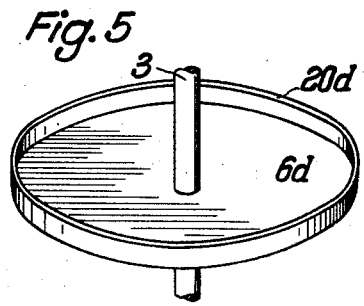
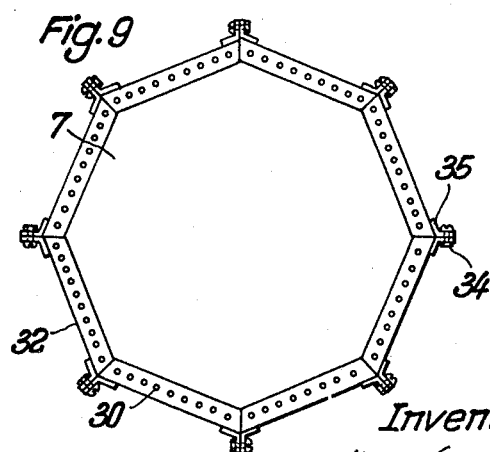
Inventor:
Hans Sommer
by:
Michael S. Striker
Attorney

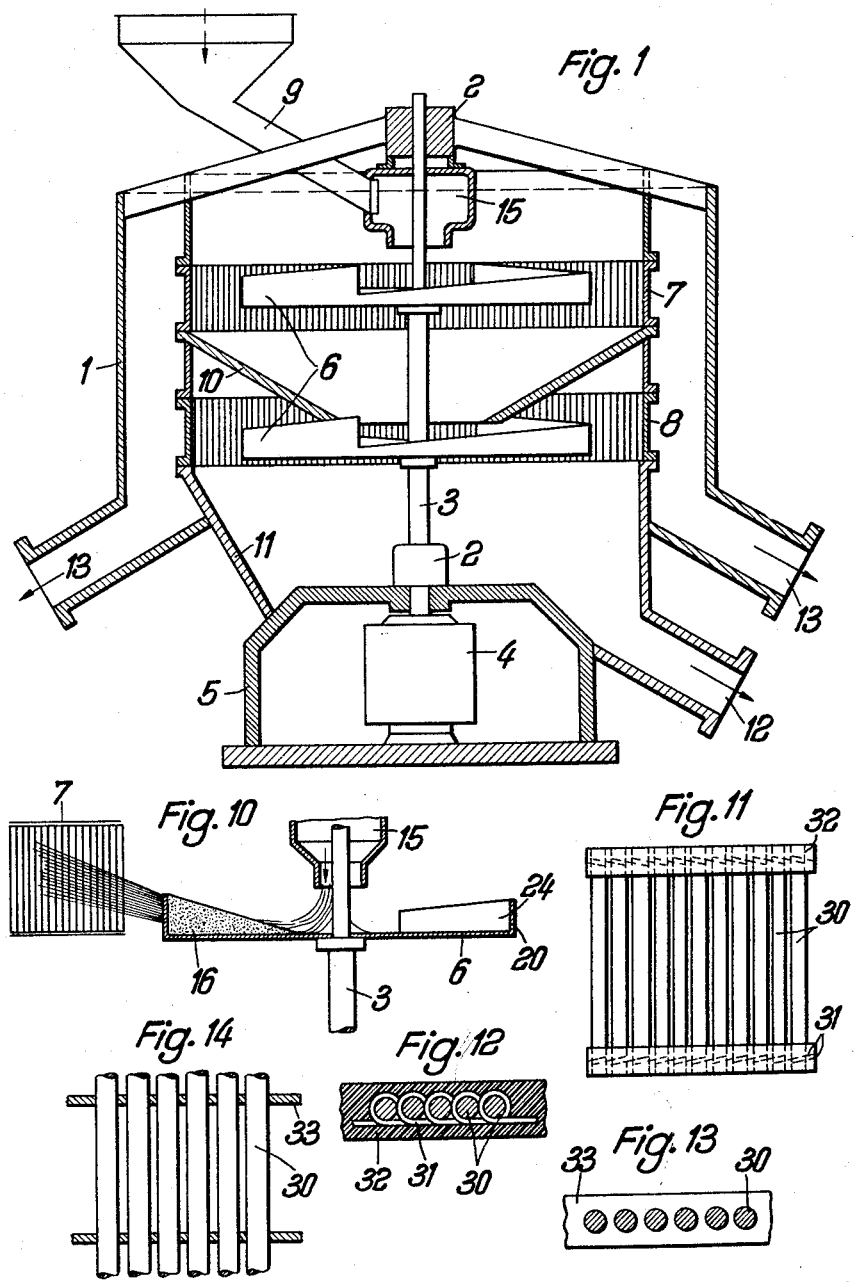

United States Patent Office 2,916,146
Patented Dec. 8, 1959

2,916,146

PROCESS AND APPARATUS FOR SEPARATING SOLID PARTICLES FROM HIGHLY VISCOUS FLUIDS

Hans Sommer, Ciment d'Obourg (Mons), Belgium, assignor to Firma Ciments d'Obourg, S.A. Obourg (Belgien)

Application November 6, 1957, Serial No. 694,837

Claims priority, application Germany November 9, 1956

8 Claims. (Cl. 210—405)

The present invention relates to a process and apparatus for separating from a thick, highly viscous fluid a portion thereof having solid particles therein.

For example, in the case of concrete which is still in liquid form, a thick, highly viscous fluid is involved, but this fluid contains relatively small particles such as particles of silica in the form of extremely small pebbles and the like, and it is necessary to separate such particles from the fluid.

At the present time such materials are passed through sieves of all types in order to separate from the fluid the undesirable particles, but with all known devices for accomplishing this result the output is quite low and the power required is very high. Furthermore, the results are not always satisfactory, and very often the machines break down or stop operating, as when the sieves become stopped up.

One of the objects of the present invention is to provide a process and apparatus which enables materials of the above type to be passed in a very efficient manner through a sieve which will separate from the fluid the portion thereof having the undesirable particles.

Another object of the present invention is to provide a process and apparatus which consumes a relatively small amount of power and which has a relatively high output in comparison with known processes and apparatus for accomplishing similar results.

A further object of the present invention is to provide an apparatus of the above type which is capable of making very efficient use of a sieve and which enables portions of the sieve to be exchanged when necessary.

An additional object of the present invention is to provide a sieve of an extremely simple construction which at the same time is capable of efficiently separating components of a fluid from the remainder thereof which passes through the sieve, this sieve being constructed so that there is very little possibility of the sieve becoming stopped up.

It is also an object of the present invention to provide a means for distributing material efficiently over predetermined surface portions or areas of a sieve.

With the above objects in view the present invention includes a process for separating from a thick, highly viscous fluid a portion thereof having solid particles therein, and in this process the material is centrifugally thrown outwardly away from a predetermined vertical axis in all directions against a vertical sieve wall which surrounds this axis so that some of the material passes through the sieve wall and some is retained in the interior thereof to be guided away after falling downwardly along the interior of the sieve wall.

The apparatus of the present invention basically includes a disc located in a horizontal plane and surrounded by the vertical sieve wall, and this disc is rotated about its substantially vertical axis so that when the thick, highly viscous fluid is deposited upon the upper face of the disc, this fluid will be centrifugally thrown outwardly against the sieve wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic, sectional, elevational view of one possible apparatus according to the present invention;

Fig. 2 is a perspective view of one embodiment of a rotary disc according to the present invention;

Fig. 3 is a perspective view of another embodiment of a rotary disc according to the present invention;

Fig. 4 is a perspective view of still another embodiment of a rotary disc according to the present invention;

Fig. 5 is a perspective view of a further embodiment of a rotary disc according to the present invention;

Fig. 6 is a perspective view of still another embodiment of a rotary disc according to the present invention;

Fig. 7 shows a disc similar to Fig. 6 provided with distributing blades;

Figs. 8A–8C respectively show in fragmentary, perspective views different arrangements of distributing blades on rotary discs similar to that of Fig. 2;

Fig. 9 is a top plan view of a sieve wall according to the present invention;

Fig. 10 diagrammatically illustrates the process of the present invention as well as the manner in which the structure of Fig. 1 operates;

Fig. 11 is an elevational view of a sieve section according to the present invention;

Fig. 12 is a sectional plan view taken through an upper portion of the sieve section of Fig. 11;

Fig. 13 is a horizontal sectional plan view of another embodiment of a sieve according to the present invention; and Fig. 14 is a fragmentary elevational view of the sieve structure of Fig. 13.

Fig. 1 diagrammatically illustrates one possible apparatus according to the present invention which is capable of performing the process of the present invention. The structure of Fig. 1 includes an outer wall 1 which may be of cylindrical configuration and which may be made up of a plurality of removable sections for a purpose described below. Within the wall 1 is located, along the axis of the wall 1, a vertical shaft 3 which is capable of rotating about its axis. This shaft 3 is supported for rotation by upper and lower bearings 2, and a motor 4 is fixed operatively to the shaft 3 for rotating the same, this motor 4 being housed within a base 5 of the machine, so that the motor 4 is insulated from the material which is worked on according to the process and apparatus of the present invention.

In the example of the invention which is illustrated in Fig. 1, the drive shaft 3 carries a pair of discs 6 each of which is located in a substantially horizontal plane and each of which rotates together with the shaft 3. Each of the discs 6 is provided at its outer peripheral edge with an upwardly extending flange so that material deposited on the top face of each disc 6 cannot be thrown outwardly away from the latter until the material reaches the elevation of the top edge of the flange of each disc 6. As is apparent from Fig. 1 the top edge of the flange of each disc 6 does not have a uniform elevation. Instead, through each half of each flange the latter has a spiral top edge, so that the flange of each disc has an edge which is of a configuration similar to a double thread.

Each of the discs 6 is surrounded by a sieve wall, and the walls 7 and 8 are shown in Fig. 1 surrounding the discs 6, respectively. These walls may have a cylindrical configuration in horizontal cross section, or they may have the cross sectional configuration of a regular polygon. For example, they may have the configuration of an octagon, as indicated in plan view in Fig. 9.

From a suitable hopper or the like the highly viscous, thick fluid is delivered by a supply pipe 9 to a distributor hub 15. This hub 15 is supported in any suitable way as by the upper bearing 2 of Fig. 1, this upper bearing being supported on any stationary bars or the like, and the hollow distributor hub 15 has a bottom discharge end from which material received in the hub 15 falls onto a central portion of the upper disc 6 of Fig. 1. The shaft 3 passes centrally through the distributor hub 15. The supply pipe 9 may extend in such a direction that the material delivered to the interior of the distributor hub 15 enters the latter in a direction which is tangential to the rotating shaft 3, and the material which moves downwardly from the distributor hub 15 onto the top face of the upper disc 6 already has a rotary component of movement when reaching the upper disc 6.

A collecting means in the form of a funnel 10 extends downwardly from a lower portion of the upper sieve wall 7, and the material which is retained by the upper sieve wall 7 and which is collected by the funnel 10 is delivered by the latter, through the bottom open end thereof, to the central portion of the lower disc 6, so that the discs 6 of Fig. 1 as well as the sieve walls 7 and 8 respectively cooperating therewith are arranged in series according to the embodiment shown in Fig. 1.

A second collecting means 11 is arranged beneath the lower sieve wall 8, and this collecting means 11 has a configuration similar to a funnel and delivers the material retained by the lower sieve wall 8 to a discharge conduit 12.

Because the fluid issuing from the pipe 9 into the hub 15 is delivered from the latter with a rotary component of movement to the upper disc 6, advantage is taken of a portion of the kinetic energy of the fluid and it is therefore possible to provide the same output while using less power from the motor 4. This motor 4 rotates both of the discs 6 at a constant speed. The material which is received on the upper face of the upper disc 6 moves outwardly under the action of centrifugal force toward the flange at the outer periphery of the disc 6, and because of the presence of this flange the material builds up to a depth corresponding to the axial length of the flange at the outer periphery of the disc 6. As soon as the fluid on the disc 6 reaches the upper edge of the flange at the outer periphery thereof, a relatively thin film of the fluid moves centrifugally beyond the upper edge of the flange to the upper sieve wall 7. Inasmuch as the elevation of the upper edge of the flange at the outer peripheral edge of the disc 6 varies about the circumference thereof, the film of fluid which is thrown outwardly from the disc spreads itself over a predetermined vertical area of the sieve wall 7, so that not all of the fluid is concentrated on a relatively small portion of the sieve wall 7. The parts are so arranged that more than half of the area of the sieve wall is engaged by the fluid thrown outwardly from the rotary disc. According to the size of the entire organization, the vertical width through which the sieve wall is engaged by the fluid may vary from 1 centimeter to a few decimeters.

In this way the wear of the sieve is more uniform over the height thereof than with sieves which are engaged by the fluid only at localized areas. In accordance with the properties of the particular fluid which is being treated with the process and apparatus of the present invention, and also in accordance with the manner in which the structure of the invention is operated, a greater or lesser percent of the fluid passes through the sieve wall 7, while the portion of the fluid retained by the sieve wall is collected by the funnel 10 and delivered by the latter to the lower disc 6 which throws the material in the same way in the form of a film outwardly beyond the upper edge of the flange of the lower disc 6 toward the lower sieve wall 8.

All of the material passing through the sieve walls 7 and 8 is collected in the space between these sieve walls and the outer wall 1 of the apparatus. The pipes 13 communicate with the space between the wall 1 and the sieve walls 7 and 8 and the material which passes through the latter sieve walls is guided away by the pipes or conduits 13 to any desired location. The material retained by the sieve wall 8 is collected by the funnel 11 and delivered to the discharge conduit 12.

The above-described structure and process is of advantage when a very effective separation of relatively small particles from the fluid is desired or when a fluid is being treated which lends itself to such a separation only with great difficulty. In many cases the passage of the fluid through a single sieve wall will be sufficient. However, in some special cases, as where a particularly thorough separation of fine and coarse materials is desired, the apparatus may be provided with three or more stages connected in series, rather than only two as shown in Fig. 1.

On the other hand, a pair of discs such as those shown in Fig. 1 may be operated in parallel, as by guiding the fluid simultaneously to both discs through a hollow shaft which carries both discs and which is provided with suitable discharge outlets for delivering the material to both of the discs simultaneously. This type of construction is particularly desirable when a high output is required, and such an arrangement operates effectively when the fluid has a very small percentage of coarse particles to be separated therefrom. It is also possible to provide arrangements where pairs of rotary discs which are connected in parallel are so arranged with respect to other pairs of discs that the latter receive the material retained by the sieves cooperating with the first pairs of discs to cause this material to pass again through sieve walls, so that in this way to advantages of both the parallel and series connections of the units are obtained.

Various embodiments of the rotary discs of the present invention are illustrated in the drawings. Thus, Fig. 2 shows an extremely simple embodiment of a rotary disc 6a, this disc being in the form of a flat circular plate fixed to the shaft 3 for rotation therewith in a horizontal plane. The fluid on such a rotary discs moves outwardly away from the outer periphery thereof in the form of an umbrella-shaped film to the sieve wall which surrounds the discs, and this sieve wall will be engaged by the material along a substantially circular line located in a substantially horizontal plane.

The disc 6b which is illustrated in Fig. 3 has an outer peripheral edge whose distance from the axis of the shaft 3 varies about the circumference of the disc, and each half of the disc 6b has its outer periphery extending along a spiral. Thus, with this disc the fluid delivered to the top face thereof is thrown out in such a way that variable centrifugal force is applied to the fluid depending upon the distance of the edge portion of the disc 6b from which the particular portion of the fluid moves toward the sieve wall. Because of the different accelerations imparted to the fluid through the disc 6b the fluid distributes itself over a substantial area of the sieve wall. Those portions of the fluid which leave the edge portions of the disc 6b which are nearest to the shaft 3 have a rather sharply curved path and engage a relatively low portion of the sieve wall, while those portions of the fluid which leave the disc 6b at edge portions thereof which are farthest away from the shaft 3 travel substantially in a straight line toward higher portions of the sieve wall. The fluid is distributed uniformly between these two extremes, and thus there is very little wear on the sieve, a better separation, and a higher output, so that the structure shown in Fig. 3 is considerably superior to that shown in Fig. 2.

The rotary disc 6c of Fig. 4 has the configuration of a regular polygon and is shown in Fig. 4 as taking the form of an equilateral triangle. However, the disc may have the form of any other regular polygon, such as that of a square. The operation of the disc of Fig. 4 is very similar to that of Fig. 3.

The rotary disc 6d of Fig. 5 is also circular, and this disc is provided at its outer periphery with an upwardly extending annular flange 20d, this flange 20d being of uniform width so that its upper free edge is located along a circle which is in a horizontal plane. Thus, the material which engages the top face of the disc 6d must build up to a depth equal to the width of the flange 20d before leaving the top edge thereof, and in this way a certain separation takes place on the disc 6d itself. The coarser particles remain on the disc, while the fine material becomes located in the upper surface of the fluid and moves in the form of an umbrella-shaped film outwardly toward the sieve wall beyond the upper edge of the flange 20d. As is evident from Fig. 10, the coarser particles deposit themselves in a layer 16 on the upper face of the disc within the flange extending upwardly from the outer edge of the disc. This coarser material which deposits itself on the top face of the discs reduces the wear on the disc. With the embodiment of Fig. 5 the umbrella fluid discharging from the upper edge of the flange 20d moves uniformly about the entire periphery of the flange 20d from the latter and engages the sieve wall along a substantially linear line of contact located in a horizontal plane.

This is in sharp contrast with the structure shown in Fig. 6, which shows the details of the rotary disc of Fig. 1. Thus, as may be seen from Fig. 6, the flange 20 located at the outer periphery of the disc 6 has the double-threaded configuration described above, and thus the material is distributed over a substantial area of the sieve wall to produce the above-mentioned advantages of reduction in wear, more effective filtering, and higher output. The arrangement shown in Fig. 6 will produce results similar to that shown in Fig. 3 and described above.

Fig. 7 illustrates how a disc 6e similar to the disc 6 and provided with a flange 20e similar to the flange 20 may be provided with distributing blades 21 in order to improve the distribution of the fluid from the rotary disc to the sieve wall. The blades 21 are uniformly distributed about the axis of the disc 6e, although only a few of the blades are illustrated in Fig. 7 for the sake of clarity, and these blades are relatively short and extend radially from the axis of the shaft 3. With these blades the area of the sieve wall to which the fluid is distributed is increased as compared to structures without blades, and the sieve is more uniformly engaged by the fluid so that the output of the device is increased with these blades.

Figs. 8A-8C illustrate further embodiments of distributor blades, these blades being shown with rotary discs of simple construction similar to that of Fig. 2. Thus, Fig. 8A shows a rotary disc 6f similar to the disc 6c and provided uniformly about its entire area with distributor blades 24 which are substantially straight and which extend radially from the axis of the disc 6f from a portion thereof located adjacent the drive shaft 3. In Fig. 8B are shown the blades 23 which are located close to the outer periphery of the disc 6g and which do not extend radially from the axis of the disc and instead are inclined with respect to radii of the disc. Fig. 8C shows blades 22 which are similar to the blades 23, except that they are curved, and these blades are carried by the disc 6h which is similar to the disc 6c. Thus, the blades 22 are curved similarly to the vanes of a pump impeller and these blades instead of being localized near the outer periphery of the disc 6h may extend close to the center thereof. In the same way, the blades 23 may be extended to a point close to the center of the disc. With the arrangement shown in Fig. 8B the blades 23 will engage the fluid after the latter has reached the outer peripheral portion of the disc.

Where the blades such as the blades 24 extend close to the center of the disc, these blades engage the fluid when it is deposited onto the central portion of the rotary disc. Where the fluid already has a rotary component of movement when it is deposited on the rotary disc, then the distributor blades operate similarly to the blades of a turbine wheel and the driving motor has its load reduced. Blades of the type described above may be used with all types of rotary discs.

In accordance with the present invention the sieve walls 7 and 8 are advantageously composed of several sieve sections. Thus, Fig. 9 shows the several sections which make up the regular octagon of the sieve shown therein, and these sections are removably connected together as by the brackets 35 which are fixed to the several sections and which become located in side by side relation so as to be interconnected by any suitable bolt and nut means 36, or the like. Thus, when it is desired to replace a given section of the sieve, a removable panel of the wall 1 is taken off and the sieve section which is worn, for example, may be removed and replaced by another sieve section which is easily interconnected into the organization through the bracket and bolt means 35, 36. Of course, the sieve unit may be of a cylindrical configuration rather than the polygonal configuration indicated in Fig. 9, and where a cylindrical configuration is used then each section of the sieve forms part of a cylinder.

In the construction shown in Fig. 1 the lower sieve wall 8 with all of its sections interconnected is located on the top edge of the collector means 11 and is removably fixed thereto in any suitable way, and a cylindrical wall is located against the top edge of the sieve wall 8 and is removably fixed to the latter in any suitable way. This cylindrical wall fixedly carries the funnel 10 and forms a downwardly extending skirt at the outer periphery of the funnel 10. The upper sieve wall 7 is located on the top periphery of the funnel 10 and is fixed thereto in any suitable way, while another cylindrical wall is located on the sieve wall 7 and is fixed thereto in any suitable way, so that whenever desired any section of the sieve wall 7 may be removed through a panel of the wall 1 which is removable and replaceable. The cylindrical wall located on the upper sieve wall 7 is formed with notches extending downwardly from its upper edge and respectively receiving the inclined bars which carry the upper bearing 2 of Fig. 1, and the latter bars are fixed as by screws or the like to the upper edge portion of the cylindrical wall 1, as indicated in Fig. 1, the supply pipe 9 extending downwardly between a pair of these inclined bars to the distributor hub 15 which is carried by the bottom surface of the upper bearing 2, in the example illustrated in Fig. 1. The motor 4 rests on the bottom wall of the hollow base 5 and is connected in any suitable way to a source of current.

In a conventional sieve, the elongated wires of the sieve are arranged so that they cross each other and are interwoven with each other so as to provide a relatively fine mesh. In contrast with this conventional construction, the sieve of the present invention consists in its entirety of elongated elements such as wires 30 (Figs. 11-14) which extend only parallel to each other, the sieve further including only a means for holding these parallel wires 30 at a predetermined distance from each other. There are no additional wires or the like extending across the wires 30 and interwoven therewith, so that the entire fineness of the sieve is controlled by the spacing between the parallel elongated elements 30.

The conventional sieves where the wires or the like cross over each other and are interwoven with each other possess the disadvantage of requiring extremely thin wires of small cross section in order to provide a sieve with a fine mesh. The size of the mesh always increases as the thickness of the wires of the sieve increases. However, with the structure of the present invention it is possible to use relatively thick wires 30 inasmuch as the fineness of the sieve depends only upon the distance between these wires. The wires 30 are retained at their ends in any suitable structure which holds the wires 30 in stretched, taut condition at a predetermined space from each other while maintaining them parallel to each other. In the embodiment shown in Figs. 11 and 12 the distance between the wires 30 is controlled by a connecting wire 31 located adjacent the end of each of the wires. Thus, there are upper and lower connecting wires 31, and it is the thickness of the wires 31 which controls the spacing between the wires 30, so that when an extremely fine wire 31 of relatively small cross section is used, the spacing between the wires 30 will be quite small. The ends of the wires 30 to which the connecting wires 31 are respectively connected are embedded in suitable bodies such as the elongated rubber bodies 32 which are vulcanized to the wires 31 and the top and bottom ends of the wires 30, in the manner shown in Figs. 11 and 12, these bodies 32 being shown in Fig. 9 which illustrates how they are shaped at their ends so as to enable the several sections to cooperate with each other.

In the embodiment of the sieve which is illustrated in Figs. 13 and 14 the wires 30 pass through openings of sheet metal strips 33, so that the openings of these strips control the spacing between the wires 30 and thus control the fineness of the sieve. The wires 30 can be fixed in any suitable way to the strips 33. It is also possible to fix the wires 30 at the desired distance from each other in other ways. For example, the ends of the wires 30 may be fused with a suitable metal body, or they may be pressed into a suitable body.

In accordance with the present invention the wires 30 are arranged so that they extend substantially vertically, and this arrangement has the advantage of providing the material retained by the sieve with downwardly directed guides, so that this material which is retained falls very easily downwardly along the interior of the sieve, and thus there is very little possibility that a sieve of the invention will become stopped up.

The structures of the present invention have been operated with very little wear and very little stopping up as compared with known sieve constructions of the same fineness, so that the reliability of the operation of the structure of the invention is highly significant. When compared with a structure which takes up the same amount of space as a structure in accordance with the present invention, the output of the structure of the invention is much greater, particularly where several stages are involved. Moreover, it is possible with the process and apparatus of the present invention to treat fluids which are of very high viscosity, while such fluids could not be handled at all with known devices.

Fig. 10 illustrates the principle of operation of the present invention. The fluid which issues from the lower discharge end of the distributing hub 15 forms on the top face of the disc 6 in the space between the inner surface 24 of the flange 20 and top face of the disc the layer 16 of coarse particles along which the lighter portions of the fluid move upwardly and beyond the top edge of the flange 20 outwardly to the sieve, as is shown diagrammatically by the sieve portion 7 shown at the left of Fig. 10.

It will be understood that each of the elements described above, or two or more together, may also find a useful application in other types of process and apparatus for separating a portion of a fluid from the remainder thereof, differing from the types described above.

While the invention has been illustrated and described as embodied in process and apparatus for separating from a thick, highly viscous fluid a portion thereof containing solid particles, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for separating from a thick, highly viscous fluid a portion thereof having solid particles therein, in combination, a substantially vertical annular sieve wall surrounding a predetermined axis; a plate surrounded by said sieve wall and supported for rotation about said axis, said plate being located in a plane normal to said axis; drive means cooperating with said plate for rotating the latter in said plane normal to said axis, so that when a thick, highly viscous fluid is applied to the top surface of said plate, the fluid will be centrifugally thrown from said plate to said sieve wall, said drive means including a drive shaft extending coaxial with said axis upwardly from said plate; means for supplying the fluid to a substantially central portion of the upper surface of said plate, said means having a tubular discharge portion coaxial with said drive shaft and an inlet portion extending in a direction tangential to the rotating shaft so as to impart a rotary component of movement to the material as it passes through said supply means onto the upper surface of said plate; collecting means located within said sieve wall for collecting material which falls downwardly along the latter and which is retained by said sieve wall in the interior thereof; and guide means located at the exterior of said sieve wall for guiding away the portion of the fluid which passes through said sieve wall.

2. In an apparatus for separating from a thick, highly viscous fluid a portion thereof having solid particles therein, in combination, a pair of annular, coaxial sieve walls spaced from each other along a vertical axis so that upper and lower sieve walls are provided; a pair of coaxial discs respectively surrounded by said sieve walls and respectively located in substantially horizontal planes normal to said common axis of said sieve walls; drive means operatively connected to said discs for rotating the same; means for supplying fluid to the upper face of the upper one of said discs, so that the material is thrown centrifugally in all directions by the upper disc toward the upper sieve wall; and a funnel located between said pair of discs and having its outer periphery located at a portion of said upper sieve wall which is at a lower elevation than said upper disc for receiving the material retained in the interior of said upper sieve wall and for directing the material back toward said axis, said funnel having a bottom open discharge end located over a substantially central portion of the lower one of said discs, so that the material retained by the upper sieve wall is thrown out by the lower one of said discs against said lower sieve wall which is not clogged up by any material sliding down in the interior of the upper sieve wall.

3. In an apparatus for separating from a thick, highly viscous fluid a portion thereof having solid particles therein, in combination, an annular substantially vertical sieve wall surrounding a predetermined substantially vertical axis; and a disc located in a substantially horizontal plane and being rotatable about said axis, said disc being surrounded by said sieve wall for throwing outwardly toward the latter a thick, highly viscous fluid deposited on the upper face of said disc, and said disc having an annular flange extending upwardly substantially normal to said plane from the outer periphery thereof, so that fluid on said disc will not be thrown outwardly toward said sieve wall until the fluid reaches the upper edge of said flange and so that a bed of solid particles will be maintained on said disc reducing thereby abrasive action of such particles on the disc.

4. In an apparatus for separating from a thick, highly viscous fluid a portion thereof having solid particles therein, in combination, an annular substantially vertical sieve wall surrounding a predetermined substantially vertical axis; and a disc located in a substantially horizontal plane and being rotatable about said axis, said disc being surrounded by said sieve wall for throwing outwardly toward the latter a thick, highly viscous fluid deposited on the upper face of said disc, and said disc having an annular flange extending upwardly inclined to said plane from the outer periphery thereof, so that fluid on said disc will not be thrown outwardly toward said sieve wall until the fluid reaches the upper edge of said flange and so that a bed of solid particles will be maintained on said disc reducing thereby abrasive action of such particles on the disc, said upper edge of said flange varying in its elevation and changing its elevation abruptly at at least one point of said edge.

5. In an apparatus for separating from a thick, highly viscous fluid a portion thereof having solid particles therein, in combination, an annular substantially vertical sieve wall surrounding a predetermined substantially vertical axis; and a disc located in a substantially horizontal plane and being rotatable about said axis, said disc being surrounded by said sieve wall for throwing outwardly toward the latter a thick, highly viscous fluid deposited on the upper face of said disc, and said disc having an annular flange extending upwardly inclined to said plane from the outer periphery thereof, so that fluid on said disc will not be thrown outwardly toward said sieve wall until the fluid reaches the upper edge of said flange and so that a bed of solid particles will be maintained on said disc reducing thereby abrasive action of such particles on the disc, said upper edge of said flange extending at a portion thereof along a spiral curve and the distance of said edge from said plane of said disc changing abruptly at opposite ends of said portion.

6. In an apparatus for separating from a thick, highly viscous fluid a portion thereof having solid particles therein, in combination, an annular substantially vertical sieve wall surrounding a predetermined substantially vertical axis; and a disc located in a substantially horizontal plane and being rotatable about said axis, said disc being surrounded by said sieve wall for throwing outwardly toward the latter a thick, highly viscous fluid deposited on the upper face of said disc, and said disc having at its outer periphery an upwardly extending annular flange, so that fluid on said disc will not be thrown outwardly toward said sieve wall until the fluid reaches the upper edge of said flange and so that a bed of solid particles will be maintained on said disc reducing thereby abrasive action of such particles on the disc, said upper edge of said flange having two portions extending each through 180° along a spiral curve rising in the same direction from a point nearer to the plane of said disc to a point farther therefrom and the farther point of each edge portion being connected to the nearer point of the edge portion adjacent thereto by a connecting edge portion substantially normal to said plane.

7. In an apparatus for separating from a thick, highly viscous fluid a portion thereof having solid particles therein, in combination, an annular substantially vertical sieve wall surrounding a predetermined substantially vertical axis; and a rotary disc surrounded by said sieve wall and being rotatable about said axis, said disc being located in a substantially horizontal plane and having an outer peripheral edge which is located at different distances from said axis at different portions of said edge, so that a fluid deposited on said disc will be thrown toward said sieve wall with different centrifugal forces depending upon the portion of the edge of said disc engaged by the fluid, each half of said outer peripheral edge of said disc extending along a spiral in the plane of said disc and the outer point of each half of said peripheral edge being connected to the inner point of the adjacent half along substantially radially extending edge portions.

8. In an apparatus for separating from a thick, highly viscous fluid a portion thereof having solid particles therein, in combination, an annular substantially vertical sieve wall surrounding a predetermined substantially vertical axis; a disc located in a substantially horizontal plane and being rotatable about said axis, said disc being surrounded by said sieve wall for throwing outwardly toward the latter a thick, highly viscous fluid deposited on the upper face of said disc, and said disc having an annular flange extending upwardly and substantially normal to said plane from the outer periphery thereof so that fluid on said disc will not be thrown outwardly toward said sieve wall until the fluid reaches the upper edge of said flange and so that a bed of solid particles will be maintained on said disc reducing thereby abrasive action of such particles on the disc, said upper end of said flange varying in its elevation and changing its elevation abruptly at at least one point of said edge; and a plurality of distributing blades carried by said flange and extending at least outwardly therefrom for distributing material on said disc toward said sieve wall.

References Cited in the file of this patent

UNITED STATES PATENTS

| 591,645 | Baker | Oct. 12, 1897 |
| 828,715 | Cook | Aug. 14, 1906 |
| 1,615,559 | Tark | Jan. 25, 1927 |
| 1,769,586 | Luense | July 1, 1930 |
| 1,769,588 | Luense | July 1, 1930 |